(12) United States Patent
Yokoyama et al.

(10) Patent No.: US 8,553,990 B2
(45) Date of Patent: Oct. 8, 2013

(54) IMAGE CLASSIFYING DEVICE, IMAGE CLASSIFYING SYSTEM, IMAGE CLASSIFYING METHOD, AND RECORDING MEDIUM

(75) Inventors: Yukinori Yokoyama, Tokyo (JP); Hotsumi Ihara, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 243 days.

(21) Appl. No.: 12/890,015

(22) Filed: Sep. 24, 2010

(65) Prior Publication Data

US 2011/0075891 A1    Mar. 31, 2011

(30) Foreign Application Priority Data

Sep. 29, 2009    (JP) ................................ 2009-225023

(51) Int. Cl.
*G06K 9/62*    (2006.01)
(52) U.S. Cl.
USPC ........................................................ 382/224
(58) Field of Classification Search
USPC ................... 382/224–225, 115, 106, 222
See application file for complete search history.

(56) References Cited

U.S. PATENT DOCUMENTS

| | | | | |
|---|---|---|---|---|
| 2002/0186412 | A1* | 12/2002 | Murashita | 358/1.16 |
| 2004/0064339 | A1 | 4/2004 | Shiota et al. | |
| 2006/0015492 | A1* | 1/2006 | Keating et al. | 707/4 |
| 2008/0232695 | A1* | 9/2008 | Noda et al. | 382/224 |

FOREIGN PATENT DOCUMENTS

| | | |
|---|---|---|
| JP | 2002-010178 | 1/2002 |
| JP | 2004-120486 | 4/2004 |
| JP | 2004-252991 | 9/2004 |
| JP | 2005-037992 | 2/2005 |
| JP | 2006-164043 | 6/2006 |
| JP | 2007-249821 | 9/2007 |
| JP | 2009-271618 | 11/2009 |

* cited by examiner

*Primary Examiner* — Bernard Krasnic
*Assistant Examiner* — Weiwan Yang
(74) *Attorney, Agent, or Firm* — Young & Thompson (57) ABSTRACT

An image classifying device comprises: a pathway data input unit for inputting a plurality of pathway data, the pathway data including person information, pathway information that is continuous location information, date information and time information; an image data input unit for inputting image data which contains imaging date/time information; a pathway data comparison unit for comparing the pathway data; an event date/time decision unit for determining an occurrence of an event and the date/time of the event based on a comparison result; and an image data classifying unit for classifying image data containing the imaging date/time information corresponding to the determined date/time of event as event image corresponding to the determined date/time of the event, the event date/time decision unit determining the occurrence of event based on a difference in the location information corresponding to a time when the time information of the compared pathway data agree.

17 Claims, 7 Drawing Sheets

| 1 | 4 | 5 | 5 | 5 | 5 | 2 |
| 4 | 3 | 1 |   |   | 3 | 5 |
| 4 |   |   | 1 |   |   | 5 |
| 4 | 1 |   | 1 |   |   | 5 |
| 4 | 3 | 1 |   |   | 2 | 5 |
| 1 | 4 | 5 | 5 | 5 | 5 | 3 |
|   | 5 | 5 |   |   |   |   |

IMAGE CLASSIFYING DEVICE, IMAGE CLASSIFYING SYSTEM, IMAGE CLASSIFYING METHOD, AND RECORDING MEDIUM

BACKGROUND OF THE INVENTION

The present invention relates to an image classifying device, an image classifying system, an image classifying method, and a computer-readable recording medium having an image classifying program recorded therein.

There have been needs to sort out images from those acquired, for example, of persons at a site they visited on a trip and which the photographer desires to share with some of the persons by annotating the images with necessary data afterwards. Further, when photographic images acquired on a trip are mixed with those of other categories in a digital camera, classification of the images was necessary to distinguish the images acquired on a trip from the others, which was a cumbersome and labor intensive process.

JP 2007-249821 A describes a content sharing system that classifies the contents produced while users participated in a common event according to either position information or time information so that the users may share contents.

JP 2002-10178 A describes an image management system that retrieves user information such as imaging date/time information, imaging location information, imaging condition information, and photographer information from image data for analysis and uses the analysis result to deduce the context of the image data (e.g., the circumstances under which an image of interest was taken).

JP 2004-252991 A describes an acquired image display system that downloads acquired images and imaging location information on the imaging locations of the acquired images and displays the acquired images as classified according to imaging location.

JP 2004-120486 A describes an album producing method using location information indicating a location where image data was acquired to calculate the distance between a location where image data was acquired and a given reference position, and decides whether the distance exceeds a given threshold to classify the image data according to the result of that decision, thereby producing album data according to the result of the classification.

However, the content sharing system described in JP 2007-249821 A could not automatically determine which event a user participated in when the user is one of users who participated in the event and only purchases contents registered by another user. Therefore, the system could not also permit only those images (contents) acquired in that event to be automatically sorted out for the user who only purchases the contents.

Because the image management system described in JP 2002-10178 A, which retrieves user information such as imaging date/time information, imaging location information, imaging condition information, and photographer information from image data for analysis in order to deduce the context, the system could not deduce a context that "an image of interest was acquired while the photographer was with a certain person other than the subject (e.g., a member of the party).

The acquired image display system described in JP 2004-252991 A, which annotates images with imaging location information, can retrieve those images acquired at locations where the photographer usually does not take photographs according to imaging location information on a location where only a small number of photographs have been taken. However, since the imaging location information only includes location information acquired when imaging is in progress, images acquired at a location seldom visited by the photographer could not be retrieved.

The album producing method described in JP 2004-120486 A classifies image data according to a distance between a given reference location and the location where the image data was acquired. Accordingly, when classification is made to sort out image data acquired at a place located at a distance that is greater than a threshold, the method cannot sort out image data of an event that occurred at a distance not greater than the threshold. The reverse is also true. JP 2004-120486 A also describes acquiring map data from a pathway information to annotate an image of interest with that map data but this only adds information on a destination of a pathway and does not suppose identification of an event based on the difference in pathway data.

SUMMARY OF THE INVENTION

An object of the present invention is to provide an image classifying device, an image classifying system, an image classifying method, and a computer-readable recording medium having an image classifying program recorded therein, whereby a pathway followed by a photographer and a person who accompanies the photographer is recorded, regardless of whether or not imaging is in progress, to permit detection of an event and achieve image data classification according to the event detected.

An image classifying device according to the present invention comprises:

a pathway data input unit for inputting a plurality of pathway data, the pathway data including person information for identifying a person, pathway information that is continuous location information indicating a pathway followed by the person, date information indicating a day on which the location information was acquired, and time information at which the location information was acquired;

an image data input unit for inputting image data which contains imaging date/time information;

a pathway data comparison unit for comparing the plurality of pathway data inputted in the pathway data input unit;

an event date/time decision unit for determining an occurrence of an event and the date/time of the event based on a comparison result given by the pathway data comparison unit; and an image data classifying unit for classifying image data containing the imaging date/time information corresponding to the date/time of event determined by the event date/time decision unit as event image corresponding to the determined date/time of the event, the event date/time decision unit determining the occurrence of event based on a difference in the location information corresponding to a time when the time information of the plurality of pathway data compared by the pathway data comparison unit agree.

An image classifying system according to the present invention comprises:

the image classifying device according to Claim 1;

an imaging means for acquiring image data containing imaging date/time information by imaging a subject; and a photographer location information acquiring means for acquiring location information on a photographer who images the subject.

An image classifying method according to the present invention comprises the steps of:

acquiring a plurality of pathway data including person information for identifying a person, pathway information that is location information indicating a continuous pathway followed by the person, date information indicating a day on which the location information was acquired, and time information at which the location information was acquired;

acquiring image data containing imaging date/time information;

comparing the acquired plurality of pathway data;

determining an occurrence of an event and determining the date/time of the event based on a difference in the location information corresponding to the same time information in the compared plurality of pathway data; and classifying image data containing the imaging date/time information corresponding to the determined date/time of the event as event image corresponding to the determined date/time of the event.

A computer readable medium according to the present invention is configured to store an image classifying program for causing a computer to execute, the program comprising the steps of:

acquiring a plurality of pathway data including person information for identifying a person, pathway information that is location information indicating a continuous pathway followed by the person, date information indicating a day on which the location information was acquired, and time information at which the location information was acquired;

acquiring image data containing imaging date/time information;

comparing the acquired plurality of pathway data;

determining an occurrence of an event and determining the date/time of the event based on a difference in the location information corresponding to the same time information in the compared plurality of pathway data; and classifying image data containing the imaging date/time information corresponding to the determined date/time of the event as event image corresponding to the determined date/time of the event.

DETAILED DESCRIPTION OF THE INVENTION

The following describes in detail the image classifying system of the present invention based upon the preferred embodiments illustrated in the accompanying drawings.

First Embodiment

Figure 1:
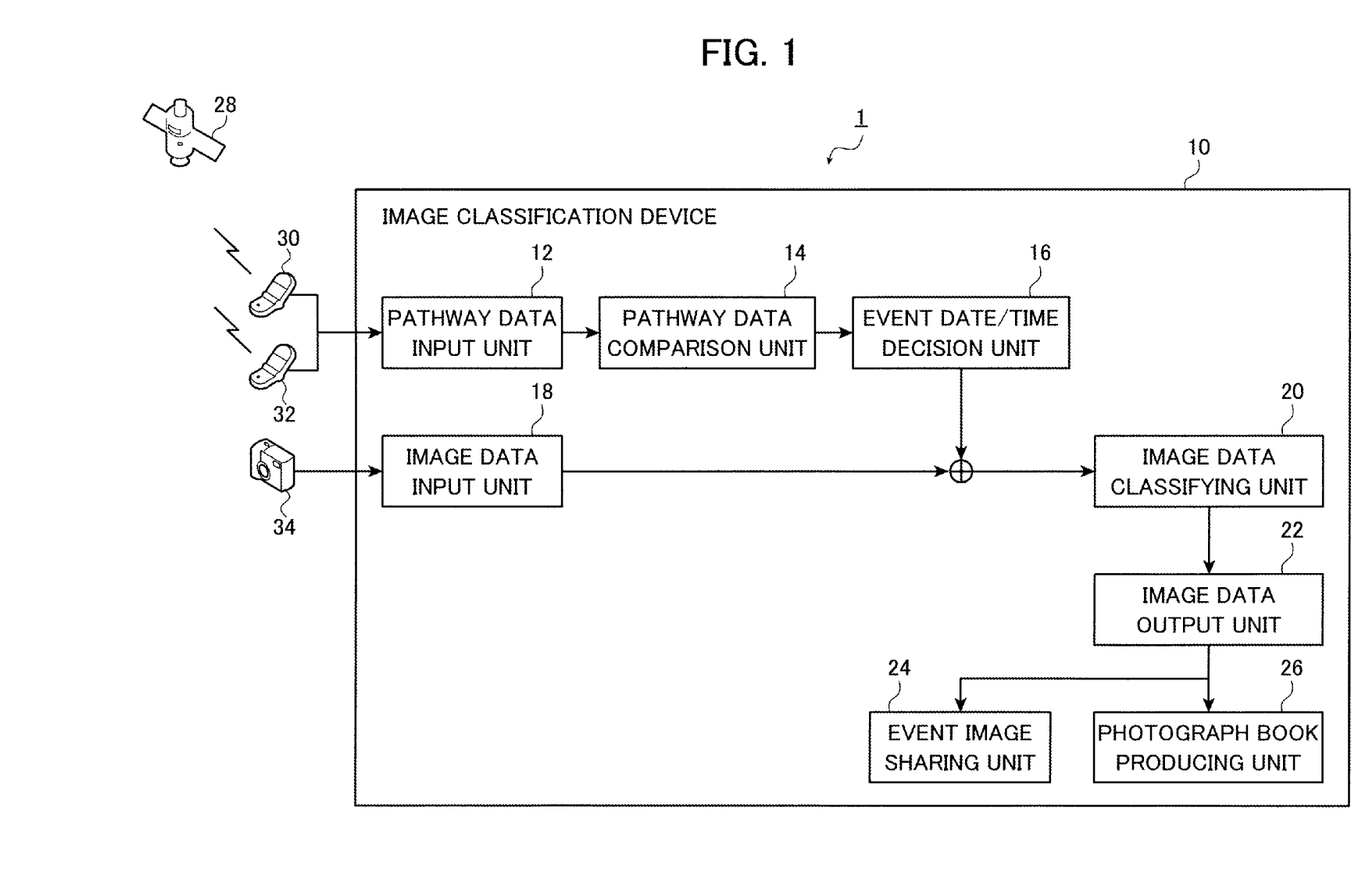
FIG. 1 is a block diagram illustrating a configuration of an image classifying system according to a first embodiment of the present invention.

FIG. 1 illustrates the configuration of an image classifying system 1 according to the first embodiment of the present invention.

The image classifying system 1 comprises an image classifying device 10, a photographer location detector 30, a party member location detector 32, and a digital camera 34.

The photographer location detector (hereinafter also referred to simply as location detector) 30 is a means for acquiring the photographer location information. The photographer enters person information on himself/herself in the location detector 30 and carries it as he/she moves to permit continuous acquisition of the photographer location information by the location detector 30. The photographer pathway information is acquired in this manner. In addition to person information and pathway information, the location detector 30 acquires pathway data containing date information indicating the date of acquisition of each location information and time information indicating the time of acquisition of each location information.

The location detector 30 carried by the photographer may, for example, be a GPS (global positioning system) receiver capable of receiving radio waves from a GPS satellite 28. The location detector 30 may be any other means than a GPS receiver capable of locating the photographer. Examples thereof include devices capable of acquiring location information by measuring the distance using the IEEE802.11 Series (so-called wireless LAN), the IEEE802.16 Series (so-called WiMAX), and the like and devices capable of acquiring location information by mapping using autonomous sensors such as an acceleration sensor and a magnetic direction sensor.

The acquired pathway data may be stored in a memory provided inside the location detector 30 carried by the photographer or transmitted over a communication line to the image classifying device described later.

Continuous acquisition of the location information denotes acquisition of the location information with a frequency sufficient to track the pathway followed by the photographer. Thus, the acquisition of the photographer location information need not necessarily be uninterrupted; it may for example be acquired once every minute.

The party member location detector (hereinafter also referred to simply as location detector) 32 is a means for acquiring location information on another person than the photographer and may be a device having the same structure as the location detector 30. The location detector 32 is carried by, for example, a member of the party who accompanied the photographer and desires to share an image or images with the photographer.

The digital camera 34 is an image acquisition means carried by the photographer. Taking a photograph with the digital camera 34 results in acquisition of image data annotated with person information on a photographer and imaging date/time information previously set in the digital camera 34. The acquired image data is stored in the built-in memory or a memory card such as an SD memory card and an SDHC memory card in the digital camera 34. The image acquisition means is not limited the digital camera 34 and may be any other device capable of acquiring images such as the camera incorporated in portable telephones.

The image classifying device 10 illustrated in FIG. 1 comprises a pathway data input unit 12, a pathway data comparison unit 14, an event date/time decision unit 16, an image data input unit 18, an image data classifying unit 20, an image data output unit 22, an event image sharing unit 24, and a photograph book data producing unit 26. The image classifying device 10 may be typically configured by a computer.

The pathway data input unit 12 is connected to the photographer location detector 30 and the party member location detector 32 with or without wire to receive signals of photographer and party member pathway data (including person information, pathway information, date information, and time information) from the photographer location detector 30 and the party member location detector 32.

From the entered pathway data signals, the pathway data input unit 12 retrieves photographer pathway data of different dates and times and the party member pathway data of different dates and times.

The pathway data comparison unit 14 is supplied with pathway data outputted from the pathway data input unit 12. The pathway data comparison unit 14 compares entered pathway data and outputs comparison result and pathway data. The comparison result is exemplified by a difference in distance between photographer location information corresponding to the same time on different days or a difference in distance between photographer location information and the party member location information corresponding to the same time on the same day.

The comparison result may be obtained by plotting photographer pathway data acquired on different days on a map divided into a matrix form. For example, the comparison result may be obtained by using a map where pathway data is plotted so that the central points in the squares of the matrix lattice that were passed by the photographer with a given frequency or more, say 60% or more, are connected to produce a representative pathway data, and pathway data formed by different squares from those forming the representative pathway is outputted as a comparison result.

The event date/time decision unit 16 is supplied with pathway data and a difference in location information (distance) outputted from the pathway data comparison unit 14. The event date/time decision unit 16 determines that an event occurred when a difference in location information is a given distance or greater or a given distance or less and outputs an event occurrence signal. The event occurrence signal contains pathway data, event occurrence date/time information, event occurrence location information, end-of-event date/time information, and end-of-event location information.

The image data input unit 18 is connected to the digital camera 34 with or without wire and supplied with a signal of image data acquired by the digital camera 34 stored in the built-in memory or a memory card such as an SD memory card and an SDHC memory card in the digital camera 34.

The image data input unit 18 retrieves and outputs image data from the entered image data signal.

The image data classifying unit 20 is supplied with the event occurrence signal outputted from the event date/time decision unit 16 and the image data outputted from the image data input unit 18. The image data classifying unit 20 retrieves person information from the pathway data contained in the event occurrence signal and checks the person information against the person information contained in the image data.

When the check proves that the photographer identified by the image data agrees with that identified by the event occurrence signal, the image data acquired in a period from the time indicated by the event occurrence date/time information to the time indicated by the end-of-event date/time information are classified as image data acquired in the event of interest. The image data classified as image data acquired in the event of interest may be provisionally stored in a storage unit not shown.

The image data may be more accurately classified using the event occurrence location information and end-of-event location information in addition to the event occurrence date/time information and the end-of-event date/time information.

The image data output unit 22 is supplied with the image data sorted out by the image data classifying unit 20 and outputs the image data according to user requirements. When the image data sorted out by the image data classifying unit 20 is stored in a storage unit not shown, the image data output unit 22 may be adapted to read image data from the storage unit and output the image data from the storage unit according to user requirements.

The event image sharing unit 24 is supplied with the image data outputted from the image data output unit 22 according to user requirements. When required by a user to permit sharing of images acquired in an event, the event image sharing unit 24 records the image data entered from the image data output unit 22 in a predetermined shared area to permit sharing of the image data. The shared area is an area such as a server connected to Internet permitting the users to share image data.

The photograph book data producing unit 26 is supplied with the image data outputted from the image data output unit 22 according to user requirements. When required by a user to produce a photograph book data of images acquired in an event, the photograph book data producing unit 26 executes processing such as allocation of the image data supplied from the image data output unit 22 into pages of the photograph book to produce photograph book data, which is stored in a storage unit not shown. Where a printer, a printing machine, or the like is connected to the image classifying device 10 to produce a photograph book, the photograph book producing unit 26 may directly transmit photograph book data it generates to the printer, etc. The photograph book data may be stored in an external storage medium such as a memory card.

Next, the operations of the image classifying system 1 of the invention will be described.

Firstly, a first embodiment will be described wherein a photographer A daily carries the location detector 30 and the digital camera 34 and, when he/she partly moved on a different pathway from his/her usual pathway, the system determines that an event occurred in a period during which the different pathway was followed.

Figure 2A:
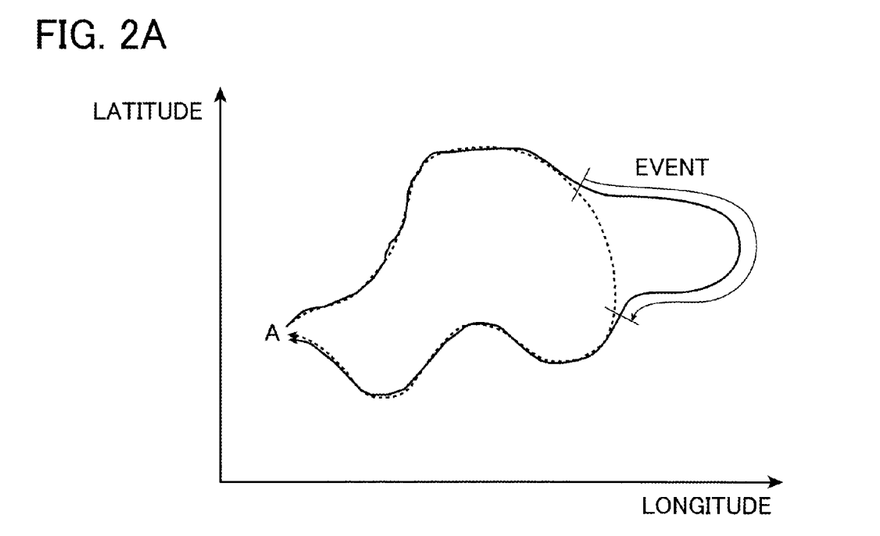
FIG. 2A is a graph illustrating pathways followed by a photographer A in the first embodiment of the invention.

Suppose, for example, that the photographer A carried the location detector 30 at a tourist site away from his/her daily pathway, taking photographs with the digital camera 34, and returned home. FIG. 2A illustrates the pathway data acquired by the location detector 30 in that event along with a usual standard pathway. The dotted line in FIG. 2A shows data representing a standard pathway repeatedly followed by the photographer A in his/her daily life. Such standard pathway data is used as a reference for detecting unusual spatial or temporal pathway. A standard pathway data may for example be data acquired by previously following a usual daily pathway that may serve as a reference (reference pathway data) or data obtained by averaging pathway data of a commuting path acquired in a past month (average pathway data).

The unusual spatial pathway is exemplified by a pathway across a tourist site that is different from the usual, standard pathway; the unusual temporal pathway is exemplified by a pathway followed in a time slot greatly different from the time slot in which the usual standard pathway is followed.

Figure 3:
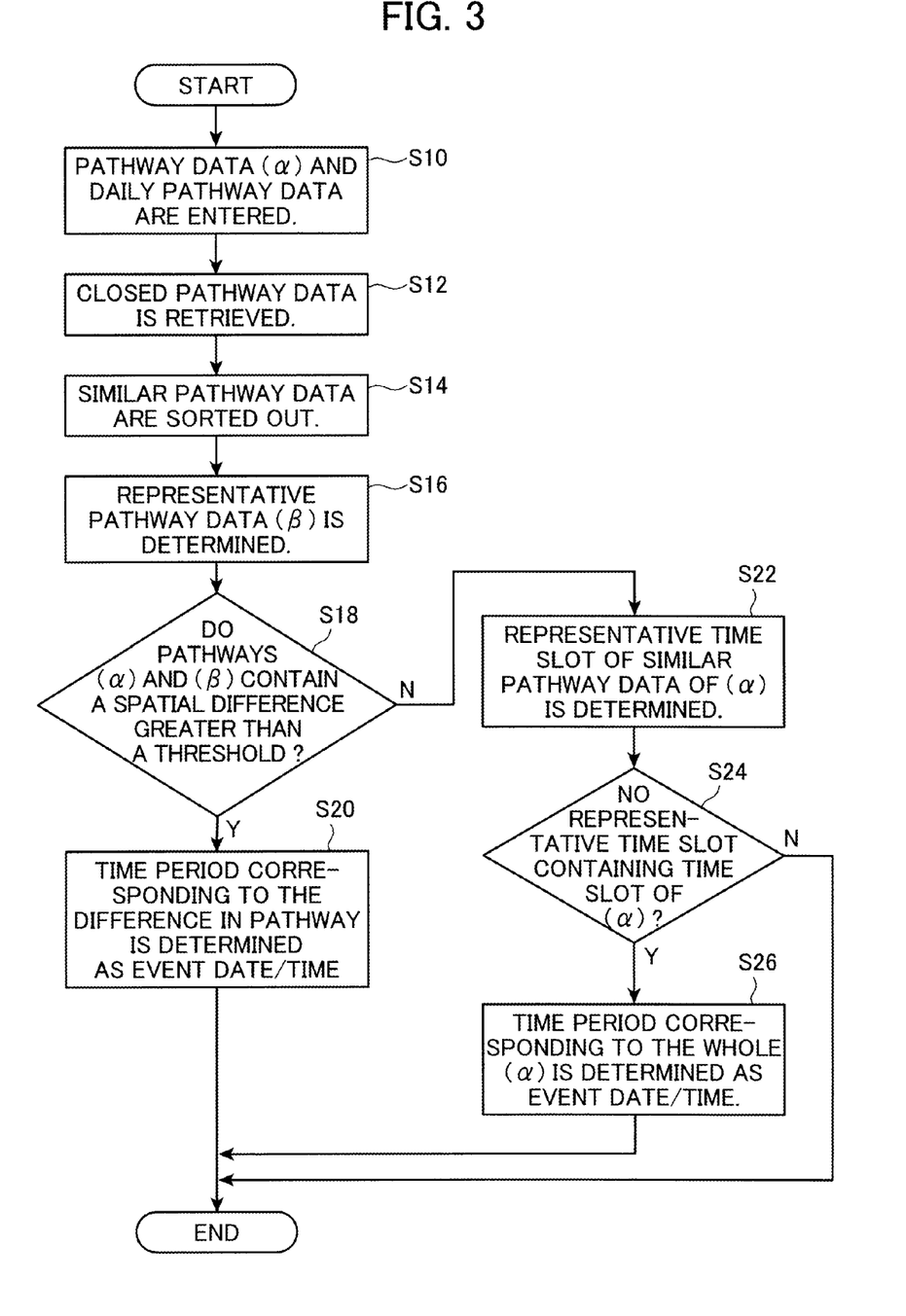
FIG. 3 is a flowchart illustrating how an event is detected in the first embodiment of the invention.
Figure 4A:
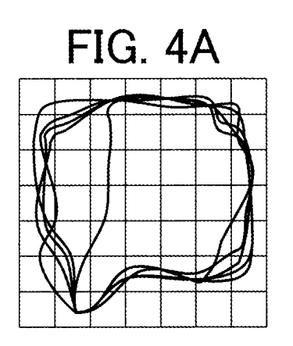
FIGS. 4A to 4E illustrate a specific example progressively showing how an event is detected in correspondence to the flowchart of FIG. 3.
Figure 4B:
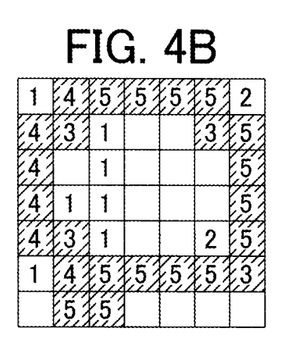
Figure 4C:
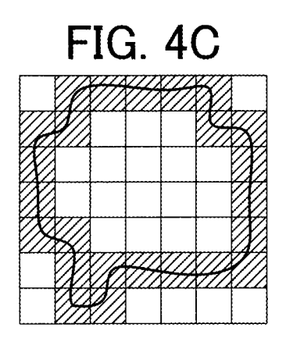

Now, we will describe a case where representative pathway data is acquired as an example of a standard pathway data obtained from a daily pathway by referring to the flowchart illustrated in FIG. 3 and the explanatory views given in FIGS. 4A to 4C.

First, one enters in the image classifying system 1 pathway data (α) acquired on a day when the photographer A visited a tourist site and the photographer A's standard daily pathway data (step S10). From all the pathway data entered in the image classifying system 1 including the pathway data (α), the photographer A's closed pathway data is retrieved (step S12). Next, from the retrieved pathway data, pathway data similar to each other are sorted out as illustrated in FIG. 4A. Similar pathway data herein means, for example, data of pathways whose ends (starting and ending points) coincide and which share a given proportion or more, say 50% or more, of the whole pathway. Sorting out such similar pathway data may be achieved using other means such as clustering.

After similar pathway data are sorted out, similar pathway data corresponding to the pathway data (α) are plotted on a map divided into squares of lattice. Then, as illustrated in FIG. 4B, the number of pathways passing each square plotted on the map is counted. As illustrated in FIG. 4C, the central points of those squares passed by a given proportion or more, say 60% or more, of the similar pathways are connected to determine a representative pathway data (β) (step S16).

Further, a representative time slot may be detected to provide a reference in detecting a temporally unusual pathway. A representative time slot to be detected may be a time slot containing a given proportion or more, say 30% or more, of the distribution of the date information and the time information (i.e., time slot) of the similar pathway data. Two or more representative time slots may be detected such as morning field-sales route and afternoon field-sales route.

Thus, the location detector 30 carried by the photographer A permits acquisition of a standard pathway data as indicated by the dotted line in FIG. 2A.

The pathway data indicated by the solid line in FIG. 2A is acquired as the photographer A also carries the location detector 30 on a day he/she visited a tourist site. That is to say, the solid line in FIG. 2A indicates pathway data that is different from the standard pathway data and shows a pathway followed on a day when the photographer A visited a tourist site.

Upon returning home, the photographer A connects the location detector 30 to the pathway data input unit 12 of the image classifying device 10 and the digital camera 34 to the image data input unit 18 of the image classifying device 10.

The pathway data input unit 12 is supplied with a signal of the pathway data of the photographer A from the location detector 30. The image data input unit 18 is supplied with image data from the memory incorporated in the digital camera 34 or a memory card such as an SD memory card and an SDHC memory card inserted in the digital camera 34.

The pathway data input unit 12 retrieves and outputs the photographer A's standard daily pathway data and his/her pathway data acquired on the day when he/she visited the tourist site.

The photographer A's standard daily pathway data and his/her pathway data acquired on the day of the visit to the tourist site are supplied from the pathway data input unit 12 to the pathway data comparison unit 14. The pathway data comparison unit 14 compares the photographer A's standard daily pathway data and his/her pathway data acquired on the day of the visit to the tourist site. The pathway data comparison unit 14 outputs the difference in distance between the standard daily pathway data and the pathway data acquired on the day of the visit to the tourist site corresponding to the same time. More specifically, the pathway data comparison unit 14 obtains and outputs the difference in distance by which the photographer A's pathway followed on the day of the visit to the tourist site deviates from the photographer A's standard daily pathway.

Figure 4D:
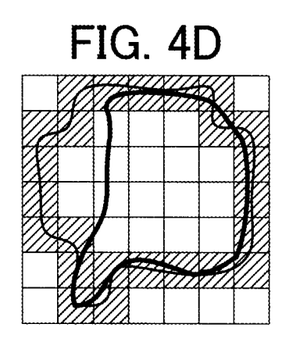
Figure 4E:
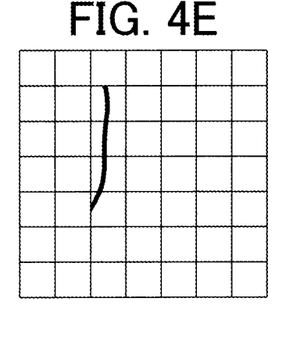

When there is a spatial difference greater than a threshold (i.e., difference in location information) between the pathway data (α) indicated by a bold line and the representative pathway data (β) indicated by a thin line entered in the pathway data comparison unit 14 corresponding to the same time as illustrated in FIG. 4D (see "Y" in the Step 18 of FIG. 3 and FIG. 4E), the pathway data comparison unit 14 outputs only the information on the squares where the location information differs between the pathway data.

The photographer A's standard pathway data, the pathway data acquired on the day of the visit to the tourist site, and the difference in location information (distance, squares) are supplied to the event date/time decision unit 16.

Figure 2B:
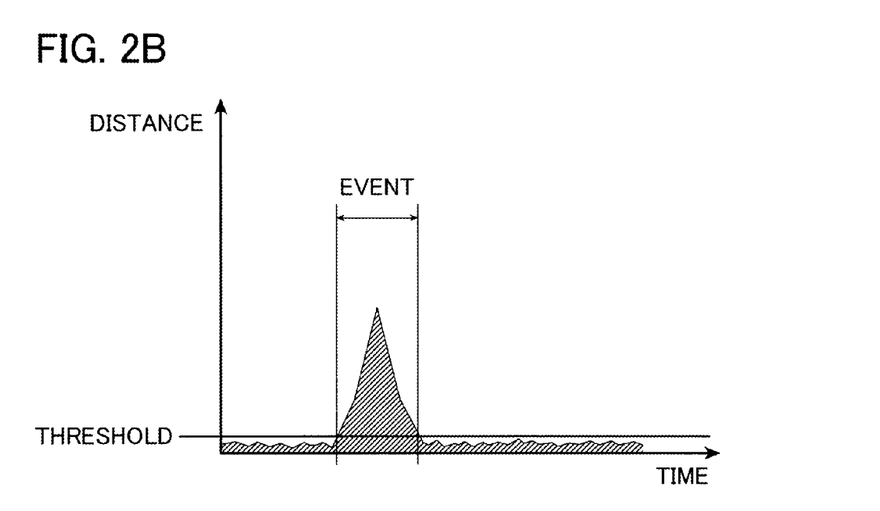
FIG. 2B is a graph illustrating a variation in location as time passes on the pathways shown in FIG. 2A.

FIG. 2B is a graph plotting the time on the horizontal axis against the distance on the vertical axis to obtain the difference in photographer A's location information corresponding to the same time. When the difference in distance between location information corresponding to the same time is a given threshold or less, the pathways are judged to be the same. When the difference in distance between location information corresponding to the same time is greater than a given threshold, the pathways are judged to be different. Such difference in distance between location information greater than a given threshold indicates that the photographer A followed a pathway that is different from the standard pathway, and the event date/time decision unit 16 determines that an event occurred and outputs an event occurrence signal.

When the pathway data (α) and the representative pathway data (β) are used, the event date/time decision unit 16 determines that an event occurred in a time period corresponding to the difference (squares) in location information, i.e., a time period corresponding to the part of the pathway involving the difference (see the step S20 in FIG. 3) and outputs an event occurrence signal.

There may be cases where the spatial difference between the representative pathway data (β) and the pathway data (α) is not greater than a threshold such as where, for example, the photographer A paid a New Year's visit to a shrine that is located on the daily pathway or close thereto instead of visiting a remote tourist site ("N" in the step S18 in FIG. 3). In such cases, the event date/time decision unit 16 detects as a representative time slot a time slot containing a given proportion or more, say 30% or more, from the time slot distribution of the similar pathway data of the pathway data (α) (step S22).

In the absence of representative time slot in the time slot of the pathway data (α) ("Y" in the step S24), the event date/time decision unit 16 determines that the event lasted during the whole time slot of the pathway data (α) (the step S26 in FIG. 3) and outputs the event occurrence signal.

When there is a representative time slot in the time slot of the pathway data (α) ("N" in the step S24), the event date/time decision unit 16 determines that no event occurred and does not output the event occurrence signal.

The event occurrence signal outputted from the event date/time decision unit 16 and the image data outputted from the image data input unit 18 are supplied to the image data classifying unit 20. The image data classifying unit 20 retrieves person information on the photographer A from the pathway data contained in the event occurrence signal and checks this person information against the person information contained in the image data. When the check proves that the photographer identified by the image data agrees with that identified by the event occurrence signal, the image data acquired in a period between the time indicated by the event occurrence date/time information and the time indicated by the end-of-event date/time information are classified as image data acquired in the event of interest and outputted from the image data classifying unit 20.

The image data classified by the image data classifying unit 20 is supplied to the image data output unit 22. The image data output unit 22 outputs the entered image data according to the requirements of the photographer A, a user.

When the photographer A desires to produce photograph book data, the image data output unit 22 supplies the image data to the photograph book producing unit 26. The photograph book producing unit 26 performs image processing on the entered image data such as page allocation to produce photograph book data, which is stored in a storage unit not shown. When the image classifying device 10 is connected to a printer, a printing machine, or the like for producing a photograph book, the photograph book data is transmitted directly to the printer, etc. to print a photograph book.

Second Embodiment

Next, a second embodiment will be described. In the second embodiment, it is assumed that the photographer A and the party member B made a trip, the former carrying the location detector 30 and the digital camera 34, the latter carrying the location detector 32, and that the photographer A, while on the trip with the party member B, moved on a pathway that is partially different from the party member B's pathway, a decision being made that an event occurred in a time slot corresponding to that part of the pathway different from the usual pathway. The party member B may be a person following the standard pathway of the trip and there may be two or more party members. When there are two or more party members, the party member B may be the representative or the party member B may be a mean value of the party members. The image classifying system 1 is the same as that in the first embodiment and a detailed description thereof will not be made.

Figure 5A:
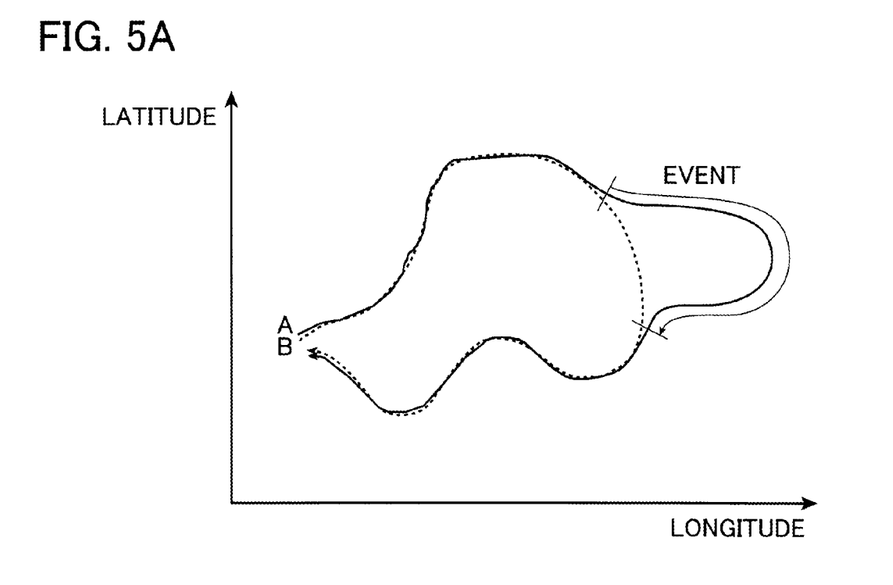
FIG. 5A is a graph illustrating pathways followed by a photographer A and a person B who accompanies the photographer in a second embodiment of the invention.

Now, suppose that the photographer A made the trip with the party member B, took some pictures with his/her digital camera 34, and thereafter returned home. FIG. 5A illustrates data of the pathways followed by the photographer A and the party member B. In FIG. 5A, the solid line indicates the pathway followed by the photographer A, and the dotted line indicates the pathway followed by the party member B.

The pathway data indicated by the solid line in FIG. 5A is acquired through the location detector 30 carried by the photographer A. The pathway data indicated by the dotted line in FIG. 5A is acquired through the location detector 32 carried by the party member B.

The party member B hands the location detector 32 to the photographer A, who, upon returning home, connects the location detectors 30, 32 to the pathway data input unit 12 of the image classifying device 10, and the digital camera 34 to the image data input unit 18 of the image classifying device 10.

The pathway data input unit 12 is supplied with the photographer A's pathway data signal from the location detector 30 and the party member B's pathway data signal from the location detector 32. Through the image data input unit 18, the digital camera 34 supplies image data from the memory incorporated in the digital camera 34 or a memory card such as an SD memory card and an SDHC memory card inserted in the digital camera 34.

The pathway data input unit 12 retrieves and outputs the photographer A's pathway data and the party member B's pathway data.

The photographer A's pathway data and the party member B's pathway data are supplied from the pathway data input unit 12 to the pathway data comparison unit 14. The pathway data comparison unit 14 compares the photographer A's pathway data and the party member B's pathway data and outputs the difference in distance between the location information on the photographer A and the party member B corresponding to the same time. That is, the output indicates the distance between the photographer A's pathway and the party member B's pathway.

The photographer A's pathway data, the party member B's pathway data, and the difference in the location information (distance) are supplied to the event date/time decision unit 16.

Figure 5B:
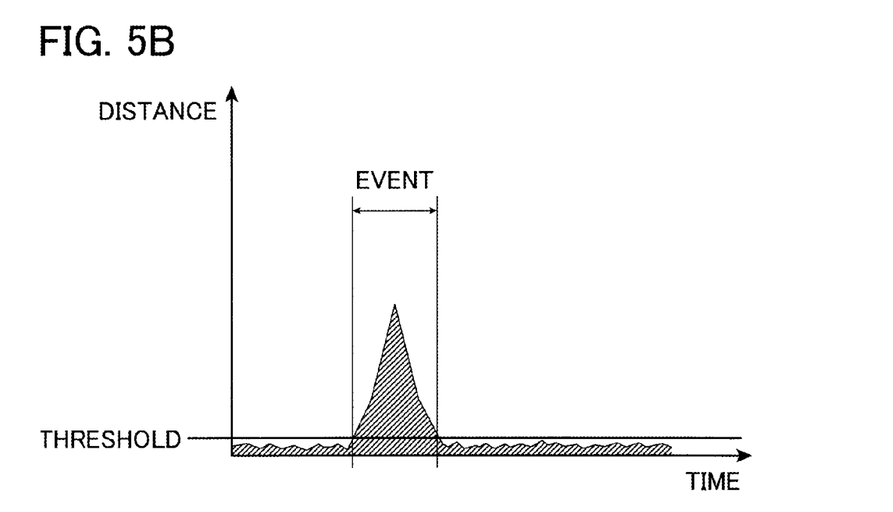
FIG. 5B is a graph illustrating a variation in location as time passes on the pathways followed by the photographer A and the person B shown in FIG. 5A.

FIG. 5B is a graph where the time on the horizontal axis is plotted against the distance on the vertical axis to obtain the difference in the location information between the photographer and the party member B corresponding to the same time. When the difference in distance between the two pathways corresponding to the same time is not greater than a given threshold, the pathways are judged to be the same. When the difference in distance between the two pathways corresponding to the same time is greater than a given threshold, the pathways are judged to be different. When the difference in distance between the two pathways followed by the photographer A and the party member B is greater than a given threshold, the photographer A and the party member B followed different pathways, and the event date/time decision unit 16 determines that an event occurred and outputs an event occurrence signal.

The event occurrence signal outputted from the event date/time decision unit 16 and the image data outputted from the image data input unit 18 are supplied to the image data classifying unit 20. The image data classifying unit 20 retrieves person information on the photographer A from the pathway data contained in the event occurrence signal and checks this person information against the person information contained in the image data. When the check proves that the photographer identified by the image data agrees with that identified by the event occurrence signal, the image data acquired in a period between the time indicated by the event occurrence date/time information and the time indicated by the end-of-event date/time information are classified as image data acquired in the event of interest and outputted from the image data classifying unit 20.

The image data sorted out by the image data classifying unit 20 is supplied to the image data output unit 22. The image data output unit 22 outputs the entered image data according to the requirements of the photographer A, a user.

When the photographer A desires to produce photograph book data corresponding to the event, the image data output unit 22 supplies the image data to the photograph book producing unit 26. The photograph book producing unit 26 performs image processing on the entered image data such as page allocation to produce photograph book data, which is stored in a storage unit not shown. When the image classifying device 10 is connected to a printer, a printing machine, or the like for producing a photograph book, the photograph book data is transmitted directly to the printer, etc. to print a photograph book.

According to this embodiment, other image data than event image data may be shared. When the photographer A desires to share with the party member B such image data acquired while moving on the same pathway as the party member B, the image data output unit 22 supplies the event image sharing unit 24 with image data sorted out by the image data classifying unit 20 as image data acquired in the other time slot than that when the event of interest occurred. The event image sharing unit 24 registers the image data supplied from the image data output unit 22 in a predetermined shared area to permit sharing of the image data with the party member B. The shared area is an area such as a server connected to Internet permitting the users to share image data. This permits sharing of image data by the photographer A and the party member B.

Third Embodiment

Next, a third embodiment will be described. In the third embodiment, it is assumed that the photographer A and the party member B made a trip, the former carrying the location detector 30 and the digital camera 34, the latter carrying the location detector 32, and that the photographer A and the party member B shared a part of their pathways during a trip, a decision being made that an event occurred in a time slot corresponding to that shared part of the pathways. Note that there may be two or more party members, in which case the party member B may be the representative or the party member B may be a mean value of the party members. The image classifying system 1 is the same as that in the first embodiment and a detailed description thereof will not be made.

Figure 6A:
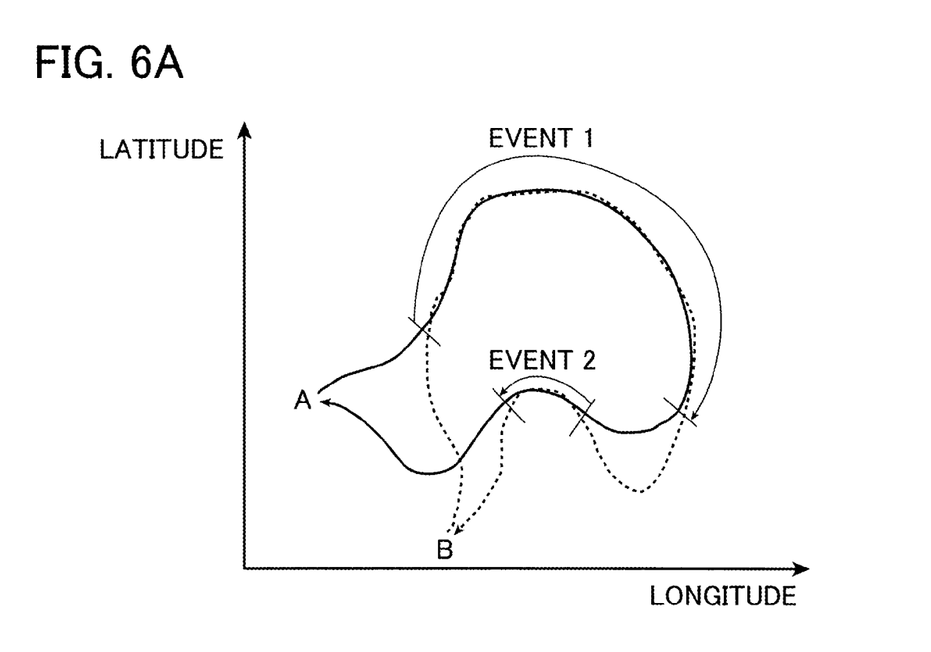
FIG. 6A is a graph illustrating pathways followed by a photographer A and a person B who accompanies the photographer in a third embodiment of the invention.

Now, suppose that the photographer A and the party member B met at a railway station or the like on their way to a destination, took some pictures with the digital camera 34 during the trip, parted at a railway station or the like on their way back before returning home. FIG. 6A illustrates the pathways followed by the photographer A and the party member B. In FIG. 6A, the solid line indicates the pathway followed by the photographer A; the dotted line indicates the pathway followed by the party member B.

The pathway data indicated by the solid line in FIG. 6A is acquired through the location detector 30 carried by the photographer A. The pathway data indicated by the dotted line in FIG. 6A is acquired through the location detector 32 carried by the party member B.

Upon returning home, the photographer A connects the location detector 30 and the location detector 32 given at a later date by the party member B to the pathway data input unit 12 of the image classifying device 10 and the digital camera 34 to the image data input unit 18 of the image classifying device 10.

Figure 7:
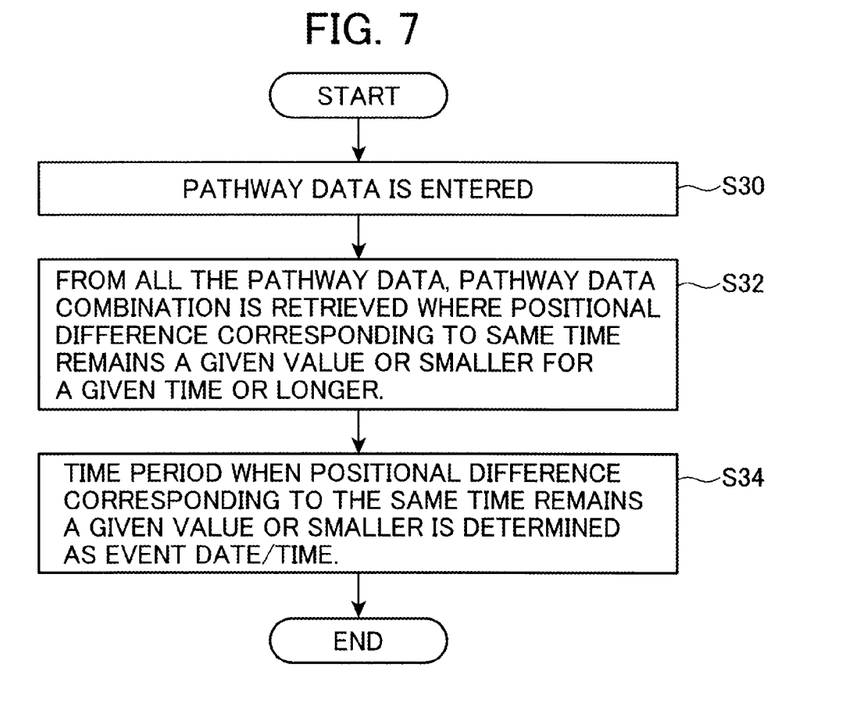
FIG. 7 is a flowchart illustrating how an event is detected in the third embodiment of the invention.

FIG. 7 is a flowchart illustrating an example of event detection.

The pathway data input unit 12 is supplied with the photographer A's pathway data signal from the location detector 30 and the party member B's pathway data signal from the location detector 32 (step S30). When there are two or more party members, respective pathway data followed by the individual party members may be entered.

Through the image data input unit 18, the digital camera 34 supplies image data from the memory incorporated in the digital camera 34 or a memory card such as an SD memory card and an SDHC memory card inserted in the digital camera 34.

The pathway data input unit 12 retrieves and outputs all the input pathway data, i.e., the photographer A's pathway data and the party member B's pathway data.

Upon returning home, the party member B may load his/her pathway data into a personal computer and converts the pathway data into the form of a data file to transmit the data file to the photographer A via electric mail service or the like. Then, upon receiving the file via electric mail service, the photographer A transmits the party member B's pathway data signal from the personal computer with which the file has been received to the pathway data input unit 12 via a LAN interface, a memory card reader, etc. (not shown) of the image classifying device 10.

The photographer A's pathway data and the party member B's pathway data are supplied to the pathway data comparison unit 14. The pathway data comparison unit 14 retrieves a combination of pathway data in which the difference in position (distance) between the photographer A and the party member B corresponding to the same time remains a given value or smaller for a given time or longer from all the entered pathway data (S32). That is, the photographer A's pathway data and the party member B's pathway data are compared and when the difference in position (distance) between them corresponding to the same time proves to remain a given value or smaller for a given time or longer, the difference in location information (distance) is outputted. Thus, the pathway data comparison unit 14 outputs the distance between the photographer A's pathway and the party member B's pathway.

Figure 8A:
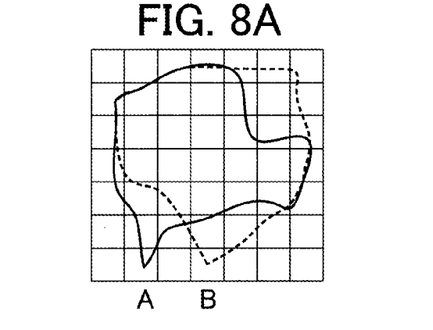
FIGS. 8A and 8B illustrate a specific example progressively showing how an event is detected in cross reference to the flowchart of FIG. 7.
Figure 8B:
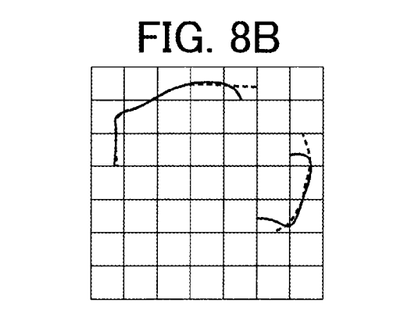

As illustrated in FIGS. 8A and 8B, the difference in location information between the photographer A and the party member B may be obtained by plotting the pathway followed by the photographer A in a solid line and the pathway followed by the party member B in a dotted line on a map divided into lattice squares. For example, when there is a given number or more of connected squares (length of time) containing both pathways (e.g., a length of connected squares contain both pathways) (step S32), the squares containing both pathways may be outputted from the pathway data comparison unit 14 as a difference in location information.

The photographer A's pathway data, the party member B's pathway data, and the difference in the location information (distance, squares) are supplied to the event date/time decision unit 16.

Figure 6B:
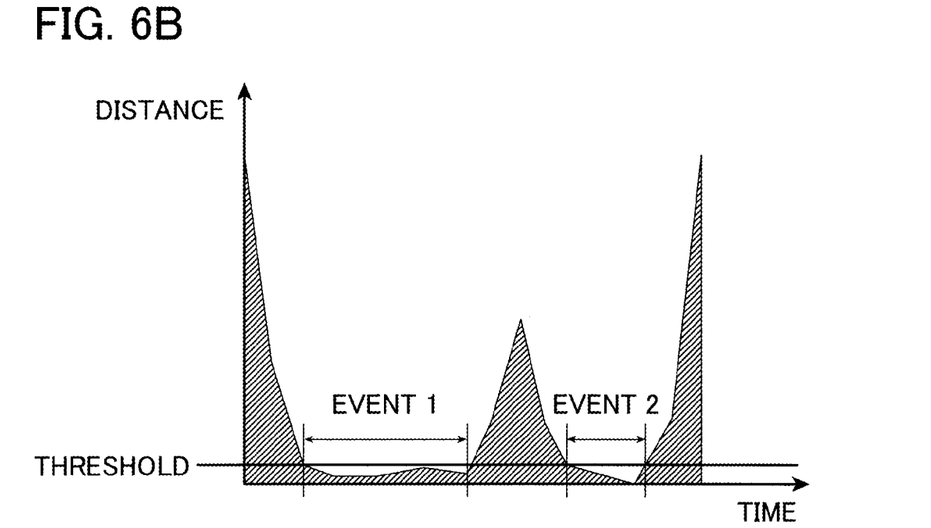
FIG. 6B is a graph illustrating a variation in location as time passes on the pathways followed by the photographer A and the person B shown in FIG. 6A.

FIG. 6B is a graph where the time on the horizontal axis is plotted against the distance on the vertical axis to obtain the difference in the location information between the photographer A and the party member B corresponding to the same time. When the difference in distance between the two pathways corresponding to the same time is not greater than a given threshold, the photographer A and the party member B are judged to have moved on the same pathway. Thus, the event date/time decision unit 16 determines that an event occurred during a time period when the photographer A and the party member B moved on the same pathway (events 1 and 2 in FIG. 6B), and outputs an event occurrence signal. When the difference in distance between the two pathways corresponding to the same time is greater than a given threshold, the photographer A and the party member B are judged to have moved on different pathways.

When the squares are used to determine the difference in location information, the event date/time decision unit 16 determines that an event occurred in a time period corresponding to the difference (squares) in location information, i.e., a time period when the photographer A's pathway and the party member B's pathway pass the same squares (step S34), and outputs an event occurrence signal.

The event occurrence signal outputted from the event date/time decision unit 16 and the image data outputted from the image data input unit 18 are supplied to the image data classifying unit 20. The image data classifying unit 20 retrieves person information on the photographer A from the pathway data contained in the event occurrence signal and checks this person information against the person information contained in the image data. When the check proves that the photographer identified by the image data agrees with that identified by the event occurrence signal, the image data acquired in a period between the time indicated by the event occurrence date/time information and the time indicated by the end-of-event date/time information are classified as image data acquired in the event of interest and outputted from the image data classifying unit 20.

The image data sorted out by the image data classifying unit 20 is supplied to the image data output unit 22. The image data output unit 22 outputs the entered image data according to the requirements of the photographer A, a user.

When the photographer A desires to share image data acquired while moving on a pathway shared by the party member B, image data sorted out by the image data classifying unit 20 as image data acquired in the event of interest is supplied from the image data output unit to the event image sharing unit 24. The event image sharing unit 24 registers the image data supplied from the image data output unit 22 in a predetermined shared area to permit sharing of the image data with the party member B. The shared area is an area such as a server connected to Internet permitting the users to share image data. This permits sharing of image data by the photographer A and the party member B.

When it is desired to produce photograph book data corresponding to the period of time when the photographer A and the party member B shared a part of their pathways, i.e., when an event was occurring, the image data output unit 22 supplies the image data to the photograph book producing unit 26. The photograph book producing unit 26 performs image processing on the entered image data such as page allocation to produce photograph book data, which is stored in a storage unit not shown. When the image classifying device 10 is connected to a printer, a printing machine, or the like for producing a photograph book, the produced photograph book data is transmitted directly to the printer, etc. to print a photograph book.

According to the invention, the steps in the above image classifying method may be formed into an image classifying program for a computer to execute. Further, the steps in the above image classifying method may be formed into an image classifying program wherein a computer serves as a means for executing the steps of the image classifying method or as a means for constituting the image classifying device and the image classifying system.

Further, the above image classifying program may be configured in the form of a computer readable medium or a computer readable memory.

While the image classifying device, the image classifying system, the image classifying method, the image classifying program, the program, and the recording medium according to the invention have been described in detail above, the present invention is not limited to the above embodiments, and various modifications may be made without departing from the spirit and scope of the invention.

What is claimed is:

1. An image classifying device comprising:
    a pathway data input unit configured for inputting a plurality of pathway data, the pathway data including a first person information for identifying a person, pathway information being continuous location information indicating a pathway followed by the first person both when an image is acquired and when an image is not acquired, date information indicating a day on which the location information was acquired, and time information at which the location information was acquired;
    an image data input unit configured for inputting image data which contains a second person information on a predetermined person and imaging date/time information;
    a pathway data comparison unit configured for comparing the plurality of pathway data inputted in the pathway data input unit;
    an event date/time decision unit configured for determining an occurrence of an event and the date/time of the event based on a comparison result given by the pathway data comparison unit and outputting an event occurrence signal which contains pathway data corresponding to the date/time of event and an event date/time information; and
    an image data classifying unit configured for checking the first person information retrieved from the pathway data contained in the event occurrence signal against the second person information contained in the image data inputted to the image data input unit and classifying image data containing the second person information which agrees with the first person information and the imaging date/time information corresponding to the event date/time information contained in the event occurrence signal as an event image corresponding to the date/time of the event determined by the event date/time decision unit,
    the pathway information inputted by the pathway data input unit is the continuous location information indicating the pathway followed by the first person including an imaging place where the image data is acquired and other locations,
    the pathway data comparison unit compares the plurality of continuous location information indicating the pathway followed by the first person including the imaging place where the image data is acquired and other locations, and
    the event date/time decision unit determines the occurrence of the event and the date/time of the event based on a difference in the location information indicating the pathway followed by the first person, as compared to the pathway followed by the second person, including the imaging place where the image data is acquired and other locations corresponding to a time when the time information of the plurality of pathway data compared by the pathway data comparison unit agree, the event being determined by the pathway of the first person being different from the pathway of the second person during a same period of time.

2. The image classifying device according to claim 1, wherein the event date/time decision unit determines that the event occurred when the difference in the location information is a given distance or greater.

3. The image classifying device according to claim 2, wherein a plurality of pathway data on one person are inputted in the pathway data input unit.

4. The image classifying device according to claim 2,
    wherein pathway data on a plurality of persons are inputted in the pathway data input unit,
    the event date/time decision unit determining the occurrence of the event based on a difference in the location information corresponding to a time when the date information and the time information in the pathway data on the plurality of persons agree.

5. The image classifying device according to claim 1, wherein the event date/time decision unit determines that the event occurred when the difference in the location information is a given distance or smaller.

6. The image classifying device according to claim 5, wherein pathway data on a plurality of persons are inputted in the pathway data input unit, the event date/time decision unit determining the occurrence of the event based on a difference in the location information corresponding to a time when the date information and the time information in the pathway data on the plurality of persons agree.

7. The image classifying device according to claim 1, further comprising an image data output unit for outputting the event image sorted out by the image data classifying unit.

8. The image classifying device according to claim 7, further comprising an event image sharing unit for sharing the event image classified by the image data classifying unit and outputted by the image data output unit with a person related to the event.

9. The image classifying device according to claim 7, further comprising a photograph book data producing unit for producing photograph book data from the event image classified by the image data classifying unit and outputted by the image data output unit.

10. An image classifying system comprising:
the image classifying device according to claim 1;
an imaging means for acquiring image data containing imaging date/time information by imaging a subject; and
a photographer location information acquiring means for acquiring location information on a photographer who images the subject.

11. The image classifying system according to claim 10, further comprising a person location information acquiring means for acquiring location information on a person other than the photographer,
pathway data on a plurality of persons are inputted in the pathway data input unit.

12. An image classifying method comprising the steps of:
acquiring a plurality of pathway data including a first person information for identifying a person, pathway information that is location information indicating a continuous pathway followed by the first person both when an image is acquired and when an image is not acquired, date information indicating a day on which the location information was acquired, and time information at which the location information was acquired;
acquiring image data containing a second person information on a predetermined person and imaging date/time information;
comparing the acquired plurality of pathway data;
determining an occurrence of an event and determining the date/time of the event based on a difference in the location information corresponding to the same time information in the compared plurality of pathway data and outputting an event occurrence signal which contains pathway data corresponding to the date/time of event and an event date/time information; and
checking the first person information retrieved from the pathway data contained in the event occurrence signal against the second person information contained in the acquired image data and classifying image data containing the second person information which agrees with the first person information and the imaging date/time information corresponding to the event date/time information contained in the event occurrence signal as event image corresponding to the determined date/time of the event,
the pathway information is the continuous location information indicating the pathway followed by the first person including an imaging place where the image data is acquired and other locations,
the plurality of continuous location information indicating the pathway followed by the first person including the imaging place where the image data is acquired and other locations are compared, and
the occurrence of event and the date/time of event are determined based on a difference in the location information indicating the pathway followed by the first person, as compared to the pathway followed by the second person, including the imaging place where the image data is acquired and other locations corresponding to a time when the time information of the plurality of pathway data agree, the event being determined by the pathway of the first person being different from the pathway of the second person during a same period of time.

13. The image classifying method according to claim 12, further comprising a step of sharing the classified and outputted event image with a person related to the event.

14. The image classifying method according to claim 12, further comprising a step of producing photograph book data from the classified and outputted event image.

15. A computer readable non-transitory medium configured to store an image classifying program for causing a computer to execute, the program comprising the steps of:
acquiring a plurality of pathway data including a first person information for identifying a first person both when an image is acquired and when an image is not acquired, pathway information that is location information indicating a continuous pathway followed by the person, date information indicating a day on which the location information was acquired, and time information at which the location information was acquired;
acquiring image data containing a second person information on predetermined person and imaging date/time information;
comparing the acquired plurality of pathway data;
determining an occurrence of an event and determining the date/time of the event based on a difference in the location information corresponding to the same time information in the compared plurality of pathway data and outputting an event occurrence signal which contains pathway data corresponding to the date/time of event and an event date/time information; and
checking the first person information retrieved from the pathway data contained in the event occurrence signal against the second person information contained in the acquired image data and classifying image data containing the second person information which agrees with the first person information and the imaging date/time information corresponding to the event date/time information contained in the event occurrence signal as event image corresponding to the determined date/time of the event,
the pathway information is the continuous location information indicating the pathway followed by the first person including an imaging place where the image data is acquired and other locations,
the plurality of continuous location information indicating the pathway followed by the first person including the imaging place where the image data is acquired and other locations are compared, and
the occurrence of event and the date/time of event are determined based on a difference in the location information indicating the pathway followed by the first person, as compared to the pathway followed by the second person, including the imaging place where the image data is acquired and other locations corresponding to a time when the time information of the plurality of pathway data agree, the event being determined by the pathway of the first person being different from the pathway of the second person during a same period of time.

16. The computer readable non-transitory medium according to claim 15, the image classifying program causing the computer to execute a further a step of sharing the classified and outputted event image with a person related to the event.

17. The computer readable non-transitory medium according to claim 15, the image classifying program causing the computer to execute a further step of producing photograph book data from the classified and outputted event image.

\* \* \* \* \*